(12) United States Patent
Batista et al.

(10) Patent No.: US 12,543,773 B2
(45) Date of Patent: Feb. 10, 2026

(54) METHOD AND SYSTEM TO MONITOR TOBACCO MATERIAL TO DETECT INSECT INFESTATION

(71) Applicant: PHILIP MORRIS PRODUCTS S.A., Neuchatel (CH)

(72) Inventors: Rui Nuno Rodrigues Alves Batista, Morges (CH); Ricardo Cali, Mannheim (DE); Ivan Prestia, Calderara di Reno (IT); Alexandra Sereda, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 262 days.

(21) Appl. No.: 18/269,343

(22) PCT Filed: Dec. 23, 2021

(86) PCT No.: PCT/EP2021/087565
§ 371 (c)(1),
(2) Date: Jun. 23, 2023

(87) PCT Pub. No.: WO2022/136670
PCT Pub. Date: Jun. 30, 2022

(65) Prior Publication Data
US 2024/0049765 A1    Feb. 15, 2024

(30) Foreign Application Priority Data

Dec. 24, 2020 (EP) .................................... 20217213

(51) Int. Cl.
*A24B 3/18* (2006.01)
*A01M 1/02* (2006.01)
(Continued)

(52) U.S. Cl.
CPC ............... *A24B 3/18* (2013.01); *A01M 1/026* (2013.01); *A24B 3/10* (2013.01); *A24B 15/18* (2013.01);
(Continued)

(58) Field of Classification Search
CPC ........... G01N 33/0027; G01N 33/0047; G01N 2333/43552; A24B 3/10; A24B 3/18; A24B 15/18; G08B 21/182; A01M 1/026
See application file for complete search history.

(56) References Cited

U.S. PATENT DOCUMENTS 6,058,940 A * 5/2000 Lane ...................... A24B 15/18
131/309
2002/0119513 A1    8/2002 Alocilja
(Continued)

FOREIGN PATENT DOCUMENTS

| CN | 1868272 | 11/2006 |
|---|---|---|
| CN | 104969998 | 2/2018 |

(Continued)

OTHER PUBLICATIONS

PCT International Search Report and Written Opinion for PCT/EP2021/087565 dated Apr. 2, 2022 (9 pages).
(Continued)

*Primary Examiner* — Benjamin R Schmitt
(74) *Attorney, Agent, or Firm* — Mueting Raasch Group

(57) ABSTRACT

The present invention relates to a method to monitor tobacco material to detect insect infestation, the method comprising: —providing tobacco material in a closed space; —measuring the concentration of a semiochemical in the air present in the closed space; —comparing the measured concentration of the semiochemical with a threshold; and—lowering the temperature of the closed space if the concentration of the semiochemical is higher than the threshold.

17 Claims, 6 Drawing Sheets

(51) Int. Cl.
  *A24B 3/10*    (2006.01)
  *A24B 15/18*   (2006.01)
  *G01N 33/00*   (2006.01)
  *G08B 21/18*   (2006.01)
(52) U.S. Cl.
  CPC ..... *G01N 33/0027* (2013.01); *G01N 33/0047* (2013.01); *G08B 21/182* (2013.01); *G01N 2333/43552* (2013.01)

(56) References Cited

U.S. PATENT DOCUMENTS

| | | | |
|---|---|---|---|
| 2004/0025892 A1 | 2/2004 | Kreyenberg | |
| 2013/0171687 A1* | 7/2013 | Moularat | G01N 33/0047 435/287.7 |
| 2019/0234895 A1 | 8/2019 | Smilanich | |
| 2020/0060252 A1* | 2/2020 | Smilanich | G01N 27/123 |

FOREIGN PATENT DOCUMENTS

| | | |
|---|---|---|
| CN | 209667824 | 11/2019 |
| CN | 111819440 | 10/2020 |

OTHER PUBLICATIONS

International Preliminary Report on Patentability for PCT/EP2021/087565 dated Mar. 17, 2023 (18 pages).
Office Action issued in China for Application No. 202180084497.8 dated Jun. 26, 2025 (33 pages). English translation included.

* cited by examiner

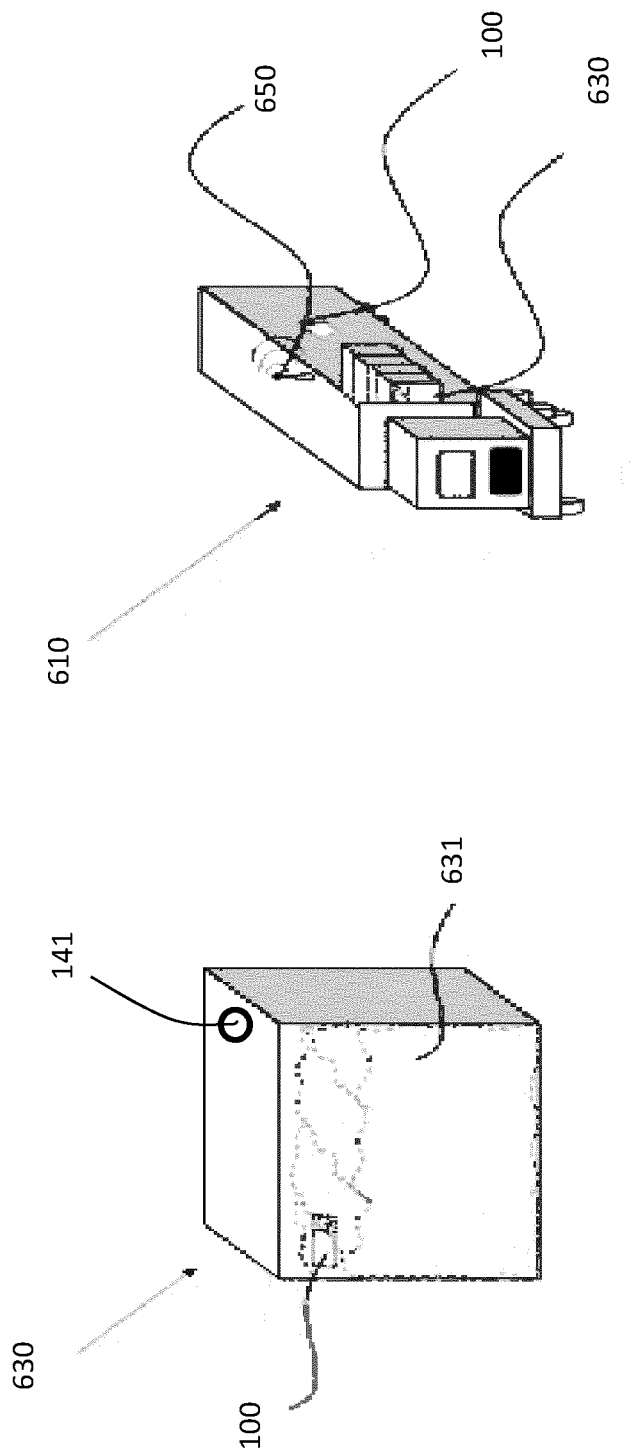

METHOD AND SYSTEM TO MONITOR TOBACCO MATERIAL TO DETECT INSECT INFESTATION

This application is a U.S. National Stage Application of International Application No. PCT/EP2021/087565 filed Dec. 23, 2021, which was published in English on Jun. 30, 2022, as International Publication No. WO 2022/136670 A1. International Application No. PCT/EP2021/087565 claims priority to European Application No. 20217213.6 filed Dec. 24, 2020.

The present invention relates to a method and a system to monitor insect infestation of tobacco material.

The tobacco infestation to be monitored is preferably the tobacco infestation caused by the tobacco beetle.

*Lasioderma serricorne* is commonly known as the cigarette beetle, cigar beetle, or tobacco beetle. As indicated by its common name, the cigarette beetle is a pest of tobacco, both in the refined cigarette packet presentation and also as stored in hogsheads and bales. The beetle may also be a minor pest of oilcake, oilseeds, cereals, dried fruit, sage, flour, and some animal products.

*Ephestia elutella* also infests the tobacco material. The *Ephestia elutella* is a tobacco moth of the family Pyralidae.

These pests damage the tobacco material, seriously impairing the quality of the end product, such as of the aerosol-generating articles.

In the tobacco industry, a relevant financial effort is spent in order to disinfest the tobacco against these pests. Furthermore, there is a constant need to monitor the tobacco material and to keep the infestation, when and if it takes place, under control.

The quality of tobacco leaves at the stage of entering a tobacco industry manufacturing line is critical to the quality of the final products. If the tobacco leaves have suffered damage due to an infestation, namely by *Lasioderma* Serricone or *Ephestia elutella*, the tobacco leaves are affected not only because they are eaten by such beetles, but also because they are damaged the by-products of the infestation. Indeed, due to the tobacco beetles' infestation, the tobacco leaves may also show signs of the presence of bacteria, microbes, or fungi, which develop in the tobacco material due to the presence of the tobacco beetles and their nesting, including eggs and larvae. In case of an infestation by the tobacco beetles, the overall quality of the tobacco leaves is thus seriously degraded. In addition, the infested tobacco leaves carry a potential risk of contaminating other tobacco leaves still having a good quality. The contamination may take place during storage of the tobacco leaves, during the manufacturing processes, and among the final products shipped to retail, potentially reaching final costumers, that is, every time there is a proximity between the infested and not-infested leaves.

When the infestation spreads, it leads to a significant disruption of the manufacturing process as the tobacco stock needs to be thrown away, and the shipping carriers, storage area, and manufacturing lines need to be cleansed and disinfected.

Currently, the preferred way to detect an infestation in tobacco material is based on physical capture of the beetles using a network of pheromone traps that need to be manually applied and daily checked, and then on taking immediate actions in case of infestation detection. Those measures are not only costly and requiring human handling and management of such traps, but they may also involve human errors. Furthermore, when the detection takes place, finding a trap full with beetles, usually it is too late because the infestation has already spread, contaminating a relative large volume of tobacco material. A widely spread infestation requires a massive application of insecticides, causing operational disruption, high costs, and environment impact.

Therefore, it would be desirable to provide a detection method that is more reliable and can identify the first point of infestation.

It is further desirable to have a method of detecting the infestation from the tobacco beetle as soon as possible so that the stored tobacco, and related finished products, at a global scale, are not damaged, either by the beetle itself or by the parallel infestation of microorganisms and fungi.

According to an aspect, the invention relates to a method to monitor tobacco material to detect insect infestation. Preferably, the method comprises: providing tobacco material in a closed space. Preferably, the method also comprises measuring the concentration of a semiochemical in the air present in the closed space. Preferably, the method comprises comparing the measured concentration of the semiochemical with a threshold. Preferably, the method comprises lowering the temperature of the closed space if the concentration of the semiochemical is higher than the threshold.

The present method is aimed to detect a possible infestation from a tobacco pest, such as *Lasioderma serricorne*, as soon as possible. For this purpose, the concentration of a specific semiochemical produced by the pest is measured in the air of the closed space where the tobacco material is located. The semiochemical may be for example a pheromone produced by the pest, such as by the tobacco beetle. The measured concentration of the semiochemical is then compared with a threshold. This comparison may be used to determine whether there is an infestation of a tobacco pest. In case there is the suspicion of such an infestation (that is, in case the concentration of the semiochemical is higher than the threshold), then the temperature of the closed space where the tobacco material is located is lowered. Due to the fact that the semiochemical is emitted by the pest at an early stage, the infestation can be detected at its beginning, so that the tobacco material may be damaged only partially or to a minor extent.

Survival of cigarette beetle, both as larvae and adults, in tobacco warehouses has been examined to determine critical temperature conditions for eradication. From these measurements, in order to disinfest the larvae and adults of the pest, the closed space, and thus the tobacco material, is preferably exposed to temperatures lower than 6 degrees Celsius. Preferably, the closed space is brought to a temperature equal to or below 6 degrees Celsius. More preferably, the temperature of the closed space is lowered for at least 7 weeks. More preferably, the closed space is maintained at a temperature equal to or below 6 degrees Celsius for a time interval equal to at least 7 weeks. More preferably, the closed space is exposed to temperatures lower than 2 degrees Celsius. Preferably, the closed space is brought to a temperature equal to or below 2 degrees Celsius. More preferably, the temperature of the closed space is lowered for at least 8 weeks. More preferably, the closed space is maintained at a temperature equal to or below 2 degrees Celsius for a time interval equal to at least 8 weeks.

The measurement of the concentration of the semiochemical may be performed continuously, that is, as soon as a measurement is finished, the next measurement takes place. Alternatively, the measurement of the concentration takes place at a given frequency. For example, the measurements can be taken at given time intervals. The frequency at which the measurements are taken may be tuned, for example depending on the amount of tobacco material present in the closed space or the size of the closed space. Other factors may influence the frequency at which the measurements are taken, for example measurements are taken more frequently if there is the concern than an infestation is present, in case a concentration has been found higher than the threshold already once. The measurement can be also taken at pre-defined points in time, such as once per week, or before a certain action, such as before the opening of the closed space and the retrieval of the tobacco material therein.

Preferably, if the tobacco material is placed in a closed space and this closed space is a tobacco bale, then the measurement of the concentration of the semiochemical is taken once a day. Preferably, if the tobacco material is placed in a closed space and this closed space is a warehouse, then the measurement of the concentration of the semiochemical is taken continuously (as soon as a measurement is finished, the next measurement takes place). Preferably, if the tobacco material is placed in a closed space and this closed space is a container, such as a shipping container, then the measurement of the concentration of the semiochemical is taken once a day. Preferably, another measurement is taken prior to the final destination. The "once per day" may mean to take the measurement for 90 minutes continuously.

In order to measure the concentration of the semiochemical, the tobacco material is located in a closed space. The tobacco material, for example in form of leaves and stems, is shipped from the farmers to the primary production unit. Thus the closed space in this case could be the transportation carrier transporting the tobacco leaves to the primary production unit, such as a track, a van, a wagon, a container, a train coach, or others. When shipped, the tobacco leaves may be first boxed, forming tobacco bales. The closed space may be the tobacco bale. When the leaves reach the primary production unit, the closed space could be a production area (for example a curing station) in the primary production line, or a part of the production area. The closed space may be a warehouse or storage building where the tobacco is stored, or a part of the warehouse or storage building. After primary, the tobacco leaves may be transported again where the tobacco leaves are further processed, for example by means of a transport carrier as defined above. The tobacco material ends its processing, becoming for example a final product such as an aerosol generating article. The aerosol generating articles may be packed. In this case, the closed space may be the package containing the aerosol generating articles.

In the closed space, air is present. In case there is an infestation, the insects infesting the tobacco material produce a semiochemical which may disperse in the air. A gas sensor, specific for the semiochemical, may then be capable to detect such semiochemical, and measure its concentration, if put into contact with the air present in the closed space. The gas sensor may be located inside the closed space or it may be located outside the closed space. In case the gas sensor is located outside the closed space, an air circuit (such as an air channel) may be present to supply the air from the closed space to the sensor.

The gas sensor used in the present invention is for example described in detail in US 2019/0234895.

The gas sensor is adapted to emit a signal representative of the concentration of the semiochemical present in the air inside the closed space. The signal may include the information relative to the concentration of the semiochemical in the air present in the closed space. This signal may be sent to a control unit. The control unit may be part of the gas sensor itself or it may be separated from the gas sensor. If the control unit is separated from the gas sensor, preferably the signal containing the information of the concentration of the semiochemical is sent to the control unit in a suitable manner known in the art. For example, the signal may be sent in a wireless manner. The communication between gas sensor and control unit may be according to one or more of the following protocols: Bluetooth, BLE, Wi-Fi, 3G, 4G, 5G, LTE, or the like. The control unit may be a processor, such as a part of a computer. For example, the control unit may be part of a mobile phone, tablet computer, or others. Preferably, the control unit is part of an equipment already present in the production line.

After the measurement, the measured value of concentration of the semiochemical is compared to a pre-set threshold. The threshold depends on the type of semiochemical of interest. The threshold may depend on the type of closed space in which the tobacco material is present. For example, in a larger closed space the threshold may be higher than in a smaller closed space. The threshold may be also changed, if needed, for example via a user interface.

The user interface may be integrated to the gas sensor, or it may be located at the control unit. The user interface may be remote to the gas sensor and control unit. Preferably, the user interface is connected to the gas sensor or the control unit and adapted to receive signals from the gas sensor or control unit. The user interface may include a dedicated screen, such as a TFT LCD screen, an IPS LCD screen, a capacitive touchscreen LCD, an LED screen, an OLED screen, an AMOLED screen, or the like.

The user interface may also display the result of the measurement of the concentration of the semiochemical. The user interface may display the result of the comparison between the measured concentration and the threshold.

The threshold is preferably set equal to a value comprised between 5 parts per millions (ppm) and 150 parts per millions, more preferably between 5 parts per million and 50 parts per million. Preferably, the response of the gas sensor in the presence of a targeted semiochemical in a concentration about or above the threshold, has a response time below one second. This response time substantially means a real-time detection. In another embodiment, the gas sensor simply measures the presence or absence of a semiochemical. As soon as the gas sensor measures the semiochemical's presence, the threshold is exceeded.

Preferably, the gas sensor may detect more than one semiochemical. The gas sensor may sense more than one semiochemical at the same time, or only one semiochemical from a list of semiochemicals. In this second case, the semiochemical of interest (also called semiochemical "target") is then selected, for example via the user interface, from the list of possible semiochemicals to be detected.

The gas sensor may comprise a database where a list of semiochemicals is present and to each semiochemical a threshold value is associated. The threshold value may depend on the closed space, so for each semiochemical of the list of semiochemicals, a list of thresholds is present.

The comparison between the concentration of the semiochemical measured by the gas sensor and the threshold may be visualized on a screen, such as in the user interface. It can be visualized in a table or a graph. The results of the various measurements made in time may be stored in a memory. The memory may be located in the gas sensor. The memory may be part of the control unit. The comparison between the concentration of the semiochemical measured by the gas sensor and the threshold may be made in the gas sensor, if the control unit is part of the gas sensor, or it may be performed remotely in the control unit, if the control unit is not part of the gas sensor. The result of the comparison may also be broadcasted to external devices, such as other computers, management unit, smartphones, alarm units or others. The result of the comparison between the concentration of the semiochemical measured by the gas sensor and the threshold may be communicated using audible words, such as via a loudspeaker.

Preferably, if the concentration of the semiochemical in the air present in the closed space is higher than the threshold, a signal is sent to a management unit. The management unit may receive the results of all comparisons, regardless of the result, or only of the positive comparisons, in which the concentration of the target semiochemical is higher than the threshold.

A management unit is a server adapted to communicate with the gas sensors or control units. The management unit is preferably adapted to trigger a procedure as a consequence of the presence of the infestation (that is, as a consequence of a concentration above the threshold). A procedure is for example the cooling of the closed space. The management unit may be included in a processor, an external server, a mobile phone or computer of a user. The management unit may be for example integrated in the process control system.

An alarm unit is a unit adapted to send an alarm in any form.

If the concentration of the semiochemical is higher than the threshold, then the closed space where the tobacco is present is to be cooled. The cooling may take place automatically, that is, upon receipt by the management unit of the positive result of the comparison between the concentration of the semiochemical and the threshold, that is, the measured concentration is higher than the threshold, the management unit starts the cooling procedure. The cooling may take place manually. In this case, an operator may realize, for example due to an alarm signal emitted by the alarm unit or by a message sent by the gas sensor or control unit to the management unit, or mobile phone, or email, or others, that the concentration of the semiochemical is above the threshold. As soon as the operator becomes aware, he may start the cooling of the closed space.

The way or means in which the closed space is cooled may depend on the type of closed space itself in which the tobacco material is housed. In particular, the type of means to reduce the temperature of the closed space may depend on the size of such closed space.

For example, if the tobacco material is located inside a container, the container may be a refrigerated container. Generally, these containers include a base wherein a refrigerating system is located. The refrigerating system is adapted to reach the desired low temperature if requested, for example by a command from a control unit.

Alternatively, the tobacco material which is located inside the container could be rerouted and brought to an environment where it is possible to have a desired low temperature. As an example, a ship containing infested tobacco material which crosses artic weather conditions on its route can stop in those weather conditions during the infestation. In the same way, a truck crossing the Alps may stop in the cold alpine weather if an infestation takes place.

If the closed space is a warehouse, or production facility or manufacturing line, the Heating, ventilation, and air conditioning (HVAC) system of the warehouse or of the production facility or of the manufacturing line is generally capable to reduce the temperature in certain designated areas. Preferably, these designated areas are sealable. In this way, the designated areas can be more efficient cooled and could be sealed upon disinfection.

If the closed spaces are tobacco bales, they can be brought inside an industrial refrigerator. These refrigerators may keep a low temperature very precisely.

Preferably, the semiochemical is a pheromone. Preferably, the insect infestation is an infestation from *Lasioderma serricorne*. Preferably, the semiochemical is one of: (2S,3R,1'S)-2,3-Dihydro-3,5-dimethyl-2-ethyl-6(1-methyl-2-oxobutyl)-4H-pyran-4-one; (2S,3R,1'R)-2,3-Dihydro-3,5-dimethyl-2-ethyl-6(1-methyl-2-oxobutyl)-4H-pyran-4-one; (2S,3R)-2,3-Dihydro-3,5-dimethyl-2-ethyl-6-(1-methyl-2-oxobutyl)-4H-pyran-4-one; (4S,6S,7S)-4,6-Dimethyl-7-hydroxynona-3-one; (2S,3S)-2,6-Diethyl-3,5-dimethyl-3,4-dihydro-2H-pyran. Preferably, the semiochemical is a pheromone produced by the tobacco beetle. The gas sensor preferably measures the concentration of α-serricorone, in chemical formula (2S,3R,1'S)-2,3-Dihydro-3,5 dimethyl-2-ethyl-6(1-methyl-2-oxobutyl)-4H-pyran-4-one. The gas sensor preferably measures the concentration of β-serricorone, in chemical formula (2S,3R,1'R)-2,3-Dihydro-3,5-dimethyl-2-ethyl-6(1-methyl-2-oxobutyl)-4H-pyran-4-one. The gas sensor preferably measures the concentration of 4S6S7S-serricornin, in chemical formula (4S,6S,7S)-7-Hydroxy-4,6-dimethylnonan-3-one. The gas sensor preferably measures the concentration of anhydroserricornin, in chemical formula (2S,3S)-2,6-Diethyl-3,5-dimethyl-3,4-dihydro-2H-pyran. The gas sensor preferably measures the concentration of 2S3R-serricorone, in chemical formula (2S,3R)-2,3-Dihydro-3,5-dimethyl-2-ethyl-6-(1-methyl-2-oxobutyl)-4H-pyran-4-one. The concentration of only one of the above pheromones may be measured. The concentration of two of the above pheromones may be measured. The concentration of three of the above pheromones may be measured. The concentration of four of the above pheromones may be measured. The concentration of all of the above pheromones may be measured. Preferably, each of the above pheromones has its specific threshold. Therefore, each measured concentration of a pheromone is compared with a possibly different threshold, which depends on the pheromone. Measuring the concentration of more than one pheromone allows to determine with greater accuracy whether an infestation is present than in case of a measurement of a single pheromone. Further, measuring the concentration of more than one pheromone may allow to determine the presence of an infestation earlier than in case of a measurement of a single pheromone. The pheromones mentioned above are all emitted by *Lasioderma serricorne*.

Preferably, the method includes: sending an alarm signal if the concentration of the semiochemical is higher than the threshold. If the concentration of the semiochemical as measured in the measuring step is higher than the threshold, an infestation of a tobacco pest may be under way. In order to minimize the impact of the infestation and the damage on the tobacco material, an alarm signal is issued. The alarm signal may be issued by the alarm unit. The alarm may be issued if the concentration of the semiochemical exceeds the threshold at least N times, where N is an integer >1. Two thresholds may be also considered, a first threshold T1 and a second threshold T2, where the second threshold is higher than the first threshold (T2>T1). If the concentration of the semiochemical is higher than the first threshold but lower than the second threshold, then at least N (where N>1) measurements where concentration >T1 need to take place before the alarm signal is issued. On the other hand, if the concentration of the semiochemical is also higher than the first threshold and the second threshold, then it is enough that in a single measurement the concentration is >T2 to issue the alarm signal. The alarm unit may be part of the control unit or the management unit.

Preferably, sending an alarm signal includes emitting an audible signal. Preferably, sending an alarm signal includes emitting a visual signal. Preferably, sending an alarm signal includes sending a digital text message to an operator or a management unit. Preferably, sending an alarm signal includes sending data relative to the measured concentration or to the comparison between the measured concentration and the threshold to an operator or a management unit. Preferably, sending an alarm signal includes emitting a visual and an audible signal. Preferably, sending an alarm signal includes sending a digital text message to an operator or a management unit and sending data relative to the measured concentration or the comparison between the measured concentration and the threshold to an operator or a management unit. Preferably, sending an alarm signal includes emitting an audible signal; emitting a visual signal; sending a digital text message to an operator or a management unit; and sending data relative to the measured concentration or the comparison between the measured concentration and the threshold to an operator or a management unit. Sending a digital text message may include sending an e-mail or a SMS or a text message via any know Application such as Messenger or WhatsApp. If the measured concentration of the target semiochemical is above the threshold, an infestation may be present. In order to minimize the damages from the infestation, action should be taken as soon as possible, that is, for example cooling the tobacco material as soon as possible. In order to do so, an alarm signal is preferably emitted, so that the surrounding is warned that cooling may take place in the closed space or to inform a technician that cooling needs to be performed because an infestation may be taking place.

Preferably, the method includes: associating an identifier to the tobacco material present in the closed space. Preferably, the method includes, if the measured concentration of the semiochemical is higher than the threshold, creating a data set comprising the identifier and a value representative of the concentration or of the comparison with the threshold value. Preferably, the method includes sending the data set to a management unit. Preferably, the identifier is a unique product identifier. The identifier identifies a given amount or quantity of tobacco material. For example, the identifier may be associated to a given tobacco's bale to identify the quantity of tobacco placed in the bale. The identifier is unique for that specific amount or quantity of tobacco material, for example the identifier is unique for that specific tobacco's bale marked with it. Unique markings on manufactured items can be used for tracking the items. For example, a customer order may be linked to the identifying label or labels of a particular shipping case or cases containing ordered products. "Products" in this context means items or other articles containing or consisting of tobacco material, from the leaves to the aerosol generating article. This allows the customer, the manufacturer and any intermediaries to constantly track the location of the required products. This may be achieved using scanners for scanning the identifiers and communicating with a verification centre. Alternatively, the identifiers can be read by a human, who can then manually communicate with a verification centre. For example, a person may use a scanner to read the identifier on a shipping case (or the identifier can be read by a human, as discussed above). The identifier details may be sent to a verification centre. The verification centre can then lookup or otherwise process the identifier details, determine the shipping case production details and send those details to the scanner. The identifiers may also be used for tracing items. For example, if the manufacturer needs to recall the products from a selected number of shipping cases, those shipping cases can be traced using their identifiers. In case the tobacco material associated to the identifier is possibly infested, that is, the concentration of the semiochemical is higher than the threshold in the air present in the closed space where such tobacco material is located, the identifier of the infested tobacco material is retrieved. To this identifier, another data is added, which is representative of the fact that an infestation may be present in the tobacco material, for example data relative to the concentration value of the semiochemical or of the result of the comparison, such as "HIGH" or a bit equal to a selected value that indicates that the threshold has been exceeded by the measured semiochemical's concentration. The identifier and the extra data form a data set which is sent to a management unit. This data set may be used to start a tracking of the infested tobacco material along the supply chain. In this way, thanks to the presence of the identifier, whatever has been in contact to the infested tobacco material can be traced. Furthermore, thanks to the "warning" of the possible infestation (the extra data), it is possible to label the identified tobacco material as infected. Tracking the infected tobacco material all along the supply chain implies that all the equipment, areas, buildings, spaces, carriers, and others, as well as other tobacco material which has been in contact or in close proximity to the infested tobacco material, can be identified as well. Suitable actions can take place in order to minimize the spreading of the infestation.

Preferably, creating a data set includes: creating a data set comprising information of the time in which the comparison has been made. Preferably, creating a data set includes: creating a data set comprising information of the geographical location of the closed space. The data set may include additional information before being sent to the management unit. Useful information can be for example the time at which the infestation has been discovered (such as the time at which the measured concentration exceeded the threshold for the first time) or the geographical location where the infested tobacco material is. The information may be processed automatically or by an operator when they reach the management unit.

Preferably, providing tobacco material in a closed space includes: providing the tobacco material in a bale. Preferably, providing tobacco material in a closed space includes: providing the tobacco material in a warehouse. Preferably, providing tobacco material in a closed space includes: providing the tobacco material in a transporting carrier. Preferably, providing tobacco material in a closed space includes: providing the tobacco material in a manufacturing area. The transporting carrier can be any: a container, a truck, a van, a cargo, a wagon, a train coach, or others. The tobacco material may be first packed in bales and then loaded in the transporting carrier. A manufacturing area is any part of a manufacturing plant or factory. It can be a well delimited part, by walls or other dividers, or an open space identified by the machines or products manufactured there. A warehouse is any building used to store the tobacco material, or the transporting carrier or the tobacco's bales. The gas sensor adapted to measure the concentration of the semiochemical in the air located inside the closed space may measure this concentration in more than one closed space. For example, the gas sensor may be located in some tobacco's bales. Furthermore, the tobacco sensor may be located in the transporting carrier. The concentration of the semiochemical can be therefore measured in the air present inside some bales and in the air present inside the transporting carrier.

Preferably, the method comprises: providing the closed space with an emitter. Preferably, the method comprises: emitting a signal if the measured concentration of the semiochemical is higher than the threshold value. Preferably, the method comprises: providing a receiver outside the closed space adapted to receive signal sent by the emitter. Preferably, the method comprises: identifying the bale as infested when the signal is received.

When an infestation is detected, a signal is emitted. This signal is sent to an operator or to the management unit. The signal may be sent for example by the control unit. The signal may contain information relative to the measured concentration of the semiochemical or only of the fact that the measured concentration of the semiochemical is higher than the threshold. This signal is received by a receiver, which can be for example connected to the management unit. Once a signal that an infestation is taking place is received, the closed space is classified as "infested" and cooling takes place. The management unit may further track the path of the infested tobacco material along the supply chain so that tobacco material, equipment and locations which entered into contact or in close proximity to the infested tobacco material can be cooled, disinfected or isolated. An alarm signal may be triggered so that operators are alerted that an infestation is under way.

Preferably, the method comprises: providing the closed space with a visual indicator having a first status and a second status. Preferably, the method comprises: displaying the first status in the visual indicator. Preferably, the method comprises: switching the displayed status from the first status to the second status if the measured concentration of the semiochemical is higher than the threshold value. In this way, it is easy to identify the infested closed spaces.

Preferably, the method comprises: measuring the concentration of at least one volatile substance produced by microbiological activity. Preferably, a volatile substance produced by microbiological activity is detected. In the tobacco material moulds, bacteria, fungi, larvae or other microorganisms may develop. The presence of these microorganisms may be due to the infestation by the tobacco beetle. These microorganisms may deteriorate, for example, the quality of the tobacco material impairing the organoleptic experience for the user when using the finished product containing the tobacco material. When a microorganism is present in the tobacco material, some volatile substances are produced and dispersed in the space surrounding the tobacco material. The volatile substances flow out from the tobacco material and are dispersed in the closed space where the tobacco material is stored. Thus, the same gas sensor may measure the concentration of the semiochemical and of the volatile substance or two different gas sensors may be present, one may measure the semiochemical and the other the volatile substance.

Preferably, the method comprises the step of measuring the concentration of the volatile substances produced by some fungi like for example *Aspergillus amstelodami, Aspergillus flavus, Fusarium culmorum, Penicillium cyclopium.*

Preferably, the step of measuring the concentration of a volatile substance produced by microbiological activity includes measuring the concentration of 1-octen-3-ol. The 1-octen-3-ol is a mushroom alcohol formed during oxidative breakdown of linoleic acid. The detection of 1-octen-3-ol allows an indication of the quality of the aerosol-generating article to be obtained Preferably, the step of measuring the concentration of a volatile substance produced by microbiological activity includes measuring the detecting the concentration of 1,3-octadiene. The presence of 1,3-octadiene is connected with fermentative process. The detection of 1,3-octadiene allows an indication of the quality of the aerosol-generating article to be obtained.

Preferably, the step of measuring the concentration of a volatile substance produced by microbiological activity includes measuring the concentration of methyl-2-ethyl-hexanoate.

Preferably, the step of measuring the concentration of a volatile substance produced by microbiological activity includes measuring the concentration of 2-methylfuran.

Preferably, the step of measuring the concentration of a volatile substance produced by microbiological activity includes measuring the concentration of 3-methylfuran.

Preferably, the step of measuring the concentration of a volatile substance produced by microbiological activity includes measuring the concentration of 3-methyl-1-butanol.

Preferably, the step of measuring the concentration of a volatile substance produced by microbiological activity includes measuring the concentration of 2-methyl-1-butanol.

Preferably, the step of measuring the concentration of a volatile substance produced by microbiological activity includes measuring the concentration of 2-heptene.

Preferably, the step of measuring the concentration of a volatile substance produced by microbiological activity includes measuring the concentration of Dimethylsulfide.

Preferably, the step of measuring the concentration of a volatile substance produced by microbiological activity includes measuring the concentration of 4-heptanone.

Preferably, the step of measuring the concentration of a volatile substance produced by microbiological activity includes measuring the concentration of (5H)-furanone;

Preferably, the step of measuring the concentration of a volatile substance produced by microbiological activity includes measuring the concentration of 3-heptanol.

Preferably, the step of measuring the concentration of a volatile substance produced by microbiological activity includes measuring the concentration of methoxybenzene.

Measuring the concentration of the semiochemical and at the same time the concentration of a volatile substance produced by microbiological activity gives a more accurate indication about whether an infestation is taking place, because an infestation by the tobacco beetle normally is accompanied by microbiological activity.

Preferably, the method provides for detecting more than one volatile substance. In this way it is possible to obtain a better indication of the quality of the tobacco material and whether an infestation is present. It may also indicate the level of damage already suffered by the tobacco material.

Preferably, if the measured concentration of the semiochemical is higher than the threshold, the method comprises: alerting an operator or the management unit. Preferably, if the measured concentration of the semiochemical is higher than the threshold, the method comprises: isolating the infested equipment, transportation carriers, storage units or tobacco material. Preferably, if the measured concentration of the semiochemical is higher than the threshold, the method comprises: marking closed spaces as infested by visual indication. Infested equipment are those equipment or tobacco material that came into contact with the infested tobacco material (that tobacco material located in a closed space the air of which had a measured concentration of semiochemical higher than the threshold). The infested equipment, carriers, storage units, tobacco material and others can be identified for example tracking the movements of the infested tobacco material along the supply chain. In order to easily identify the infested closed spaces, a visual indicator is used, or example a red light or a blinking light. "Isolating" equipment, carriers, storage units or tobacco material means to keep the equipment, carriers, storage units or tobacco material away from other elements by putting them in a different place so that contact with further tobacco material is avoided.

Preferably, the method comprises: tracking the tobacco material in the closed space along the supply line. Preferably, the method comprises: if the mesured concentration of the semiochemical in the air present in the closed environment is higher than the threshold, then: identifying locations, equipment, storage units, other tobacco material, transportation carrier which have been in contact or in proximity to the tobacco material the semiochemical concentration of which is above the threshold along the supply line. Preferably, the method comprises: if the measured concentration of the semiochemical in the air present in the closed environment is higher than the threshold value, then: disinfecting or lowering the temperature or isolating the identified locations, equipment, transportation carrier, storage units or other tobacco material. As soon as the infestation is discovered, the movements of the tobacco material is preferably traced along the supply line. In this way, everything that has been in contact with the infested tobacco material or in closed proximity to it can be disinfested as well. Moreover, the further spreading of the infestation is minimized.

According to another aspect, the invention relates to a system to detect the presence of an infestation in tobacco material, the system comprising: a closed space adapted to house the tobacco material. Preferably, the system further comprises a gas sensor adapted to measure the concentration of a semiochemical in the air present in the closed space and adapted to emit a signal representative of the measured concentration. Preferably, the system comprises a cooling unit adapted to lower the temperature in the closed space. Preferably, the system comprises a control unit connected to the gas sensor and the cooling unit, the control unit being adapted to receive the signal from the gas sensor, to compare the signal with a threshold and to command the cooling unit to cool the closed space if the signal is above the threshold.

The advantages of this aspect have been already discussed with reference to the method and not repeated herewith.

Preferably, the system comprises a second gas sensor adapted to measure the concentration of a volatile substance in the air present in the closed space. Preferably, the second gas sensor is an electronic nose. Preferably, the second gas sensor is the electronic nose developed by Smelldect (https://smelldect.de/). This sensor is described in detail in DE102014002077 in the name of KARLSRUHER INST FÜR TECHNOLOGIE.

Preferably, the second gas sensor comprises a sensor with nanofibers base on tin dioxide, a scent profile and a control unit.

Preferably, the system includes an air conduit to channel air present in the closed space towards the gas sensor. The gas sensor may be inside or outside the closed space. In any case, a channel preferably channels air from the closed space to the sensor.

Preferably, the system comprises an alarm adapted to emit an alarm signal if the signal is above the threshold value. The alarm signal may be an acoustic signal, a visual signal or an electronic signal emitted through communication means. For example, the alarm signal is sent as an electronic text message.

Preferably, the system comprises a wireless emitter adapted to send data representative to the concentration or the comparison to a management unit.

A "hormone" as indicated herein indicates a regulatory substance produced in an organism by glands in multicellular organisms. Hormones are produced by many animals. Hormones are transported by the circulatory system to target distant organs. Hormones may have diverse chemical structures mainly belong to three classes: eicosanoids, steroids and amino acid/protein derivatives. Hormone secretion may occur in different tissues and the secreted hormone may be transported through the body in many different ways.

A "pherormone" is a compound that is secreted or excreted by an organism and that triggers a social response. Pherormones are chemical compounds capable of acting like hormones outside the body of the secreting organism to impact the behavior of the receiving organism. The receiving organism may be an organism of the same specie of the secreting organism.

The term "tobacco material" refers to any part of a tobacco plant or a mixture of different tobacco plants and includes without limitation tobacco leaf scraps, tobacco green leaf scraps, tobacco stems, tobacco dust created during tobacco processing, and tobacco leaf prime lamina strip and a combination thereof. The tobacco material can have the form of processed tobacco parts or pieces, cured and aged tobacco in essentially natural lamina or stem form, a tobacco extract or a mixture of the foregoing, for example, a mixture that combines extracted tobacco pulp with granulated cured and aged natural tobacco lamina. The tobacco material can be in solid form, in liquid form, in semi-solid form, or the like. Preferably, the term "tobacco material" includes any part and any related by-product, such as for example the leaves or stems, of any member of the genus *Nicotiana*. The tobacco material for use in the present invention is preferably from the species *Nicotiana tabacum*. Any type, style or variety of tobacco may be treated. Examples of tobacco which may be used include but are not limited to Virginia, Burley, and Oriental tobaccos, and blends of any of these types. Preferably, the tobacco material comprises Kasturi tobacco. The tobacco material to be treated may comprise or consist of post-curing tobacco.

Tobacco material may be loose or already contained in the finished product, such as in an aerosol generating article.

A "bale" of tobacco material is a package of tobacco material bound and usually but not necessarily wrapped or closed in a box.

In the following, with the term "upstream" or "downstream", reference is made to the direction of motion or transport of the tobacco material or of the bales containing the tobacco material.

As used herein, the terms "horizontal" and "vertical" have their standard meaning.

A "semiochemical" is a chemical substance or mixture released by an organism that affects the behaviors of other individuals. Semiochemical communication can be divided into two broad classes: communication between individuals of the same species (intraspecific) or communication between different species (interspecific). It encompasses pheromones, allomones, kairomones, attractants and repellents. Many insects, including parasitic insects, use semiochemicals. Pheromones are intraspecific signals that aid in finding mates, food and habitat resources, warning of enemies, and avoiding competition. Interspecific signals known as allomones and kairomones have similar functions.

As used herein, "unique product identifier" means an identifier that uniquely identifies a product. Each product is given a different unique product identifier. The unique product identifier is typically a numerical or alphanumerical sequence or value.

The invention is defined in the claims. However, below there is provided a non-exhaustive list of non-limiting examples. Any one or more of the features of these examples may be combined with any one or more features of another example, embodiment, or aspect described herein.

Example Ex 1: A method to monitor tobacco material to detect insect infestation, the method comprising:
  providing tobacco material in a closed space;
  measuring the concentration of a semiochemical in the air present in the closed space;
  comparing the measured concentration of the pheromone with a threshold;
  lowering the temperature of the closed space if the concentration of the pheromone is higher than the threshold.

Example Ex1: The method according to Ex1, wherein threshold value is equal to between 5 parts per million and 150 parts per million.

Example Ex3: The method according to Ex1 or Ex2, wherein the step of lowering the temperature includes lowering the temperature of the closed space below 6 degrees Celsius.

Example Ex4: The method according to Ex3, wherein the step of lowering the temperature includes lowering the temperature of the closed space below 2 degrees Celsius.

Example Ex5: The method according to Ex3 or Ex4, wherein the step of lowering the temperature includes lowering the temperature of the closed space for at least 7 weeks.

Example Ex6: The method according to one or more of Ex1-Ex5, wherein the semiochemical is one or more of:
(2S,3R,1'S)-2,3-Dihydro-3,5-dimethyl-2-ethyl-6(1-methyl-2-oxobutyl)-4H-pyran-4-one;
(2S,3R,1'R)-2,3-Dihydro-3,5-dimethyl-2-ethyl-6(1-methyl-2-oxobutyl)-4H-pyran-4-one;
(2S,3R)-2,3-Dihydro-3,5-dimethyl-2-ethyl-6-(1-methyl-2-oxobutyl)-4H-pyran-4-one;
(4S,6S,7S)-4,6-Dimethyl-7-hydroxynona-3-one;
(2S,3S)-2,6-Diethyl-3,5-dimethyl-3,4-dihydro-2H-pyran.

Example Ex7: The method according to one or more of Ex1-Ex6, including:
  sending an alarm signal if the measured concentration of the semiochemical is higher than the threshold.

Example Ex8: The method according to one or more of Ex1-Ex7, wherein sending an alarm signal includes one of:
  emitting an audible signal;
  emitting a visual signal;
  sending a digital text message to an operator or a management unit;
  sending data relative to the measured concentration of the semiochemical, or to the comparison between the measured concentration and the threshold to an operator or a remote server or a management unit.

Example Ex9: The method according to one or more of Ex1-Ex8, including:
  associating an identifier to the tobacco material present in the closed space;
  if the measured concentration of the semiochemical is higher than the threshold, creating a data set comprising the identifier and a value representative of the measured concentration or of the comparison between the measured concentration and the threshold;
  sending the data set to a control unit.

Example Ex10: The method according to Ex9, wherein creating a data set includes:
  creating a data set comprising information of the time in which the comparison has been made.

Example Ex11: The method according to Ex9 or Ex10, wherein creating a data set includes:
  creating a data set comprising information of the geographical location of the closed space.

Example Ex12: The method according to one or more of Ex1-Ex11, wherein providing tobacco material in a closed space includes one or more:
  providing the tobacco material in a bale;
  providing the tobacco material in a warehouse;
  providing the tobacco material in a transporting carrier;
  providing the tobacco material in a manufacturing area.

Example Ex13: The method according to one or more of Ex1-Ex12, comprising:
  providing the closed space with an emitter;
  emitting a signal if the measured concentration of the semiochemical is higher than the threshold;
  providing a receiver outside the closed space adapted to receive signal sent by the emitter;
  identifying the closed space as infested if the signal is received.

Example Ex14: The method according to Ex13, comprising:
  providing the tobacco material in a bale;
  providing the bale with an emitter;
  emitting a signal if the measured concentration of the semiochemical is higher than the threshold;
  providing a receiver outside the bale adapted to receive signal sent by the emitter;
  identifying the bale as infested if the signal is received.

Example Ex15: The method according to Ex13, comprising:
  providing the tobacco material in a transporting carrier;
  providing the transporting carrier with an emitter;
  emitting a signal if the measured concentration of the semiochemical is higher than the threshold;
  providing a receiver outside the transporting carrier adapted to receive signal sent by the emitter;
  identifying the transporting carrier as infested if the signal is received.

Example Ex16: The method according to Ex13, comprising:
  providing the tobacco material in a warehouse;
  providing the warehouse with an emitter;
  emitting a signal if the measured concentration of the semiochemical is higher than the threshold;
  providing a receiver outside the warehouse adapted to receive signal sent by the emitter;
  identifying the warehouse as infested if the signal is received.

Example Ex17: The method according to Ex13, comprising:
  providing the tobacco material in a manufacturing area;
  providing the manufacturing area with an emitter;
  emitting a signal if the measured concentration of the semiochemical is higher than the threshold;
  providing a receiver outside the manufacturing area adapted to receive signal sent by the emitter;

identifying the manufacturing area as infested if the signal is received.

Example Ex18: The method according to one or more of Ex1-Ex17, comprising:
providing the closed space with a visual indicator having a first status and a second status;
displaying the first status in the visual indicator;
switching the displayed status from the first status to the second status if the measured concentration of the semiochemical is higher than the threshold value.

Example Ex19: The method according to Ex18, comprising:
providing the tobacco material in a bale;
providing the bale with a visual indicator having a first status and a second status;
displaying the first status in the visual indicator;
switching the displayed status from the first status to the second status if the measured concentration of the semiochemical is higher than the threshold value.

Example Ex20: The method according to Ex18, comprising:
providing the tobacco material in a transporting carrier;
providing the transporting carrier with a visual indicator having a first status and a second status;
displaying the first status in the visual indicator;
switching the displayed status from the first status to the second status if the measured concentration of the semiochemical is higher than the threshold value.

Example Ex21: The method according to Ex18, comprising:
providing the tobacco material in a warehouse;
providing the warehouse with a visual indicator having a first status and a second status;
displaying the first status in the visual indicator;
switching the displayed status from the first status to the second status if the measured concentration of the semiochemical is higher than the threshold value.

Example Ex22: The method according to Ex18, comprising:
providing the tobacco material in a manufacturing area;
providing the manufacturing area with a visual indicator having a first status and a second status;
displaying the first status in the visual indicator;
switching the displayed status from the first status to the second status if the measured concentration of the semiochemical is higher than the threshold value.

Example Ex23: The method according to one or more of Ex1-Ex22, comprising:
measuring the concentration of a volatile substance produced by microbiological activity in the air present in the closed space.

Example Ex24: The method according to Ex23, wherein the volatile substance is:
1-octen-3-ol.

Example Ex25: The method according to Ex23 or Ex24, wherein the volatile substance is:
1,3-octadiene.

Example Ex26: The method according to one or more of Ex23-Ex25, wherein the volatile substance is:
methyl-2-ethylhexanoate.

Example Ex27: The method according to one or more of Ex23-Ex26, wherein the volatile substance is:
2-methylfuran.

Example Ex28: The method according to one or more of Ex23-Ex27, wherein the volatile substance is:
3-methylfuran.

Example Ex29: The method according to one or more of Ex23-Ex28, wherein the volatile substance is:
3-methyl-1-butanol.

Example Ex30: The method according to one or more of Ex23-Ex29, wherein the volatile substance is:
2-methyl-1-butanol.

Example Ex31: The method according to one or more of Ex21-Ex30, wherein the volatile substance is:
2-heptene.

Example Ex32: The method according to one or more of Ex21-Ex31, wherein the volatile substance is:
Dimethylsulfide.

Example Ex33: The method according to one or more of Ex21-Ex32, wherein the volatile substance is:
4-heptanone.

Example Ex34: The method according to one or more of Ex21-Ex33, wherein the volatile substance is:
(5H)-furanone.

Example Ex35: The method according to one or more of Ex21-Ex34, wherein the volatile substance is:
3-heptanol.

Example Ex36: The method according to one or more of Ex21-Ex35, wherein the volatile substance is:
Methoxybenzene.

Example Ex37: The method according to one or more of Ex1-Ex36, comprising, if the measured concentration of the semiochemical is higher than the threshold, one or more of:
alerting a management unit or an operator;
isolating infested equipment, transportation carrier or tobacco material:
marking closed spaces as infested by visual indication.

Example Ex38: The method according to one or more of Ex1-Ex37, comprising:
tracking the tobacco material present in the closed space along the supply line;
if the measured concentration of the semiochemical in the air present in the closed space is higher than the threshold, then:
identifying equipment, storage areas, other tobacco material, transportation carrier which has been in contact or in proximity to the tobacco material the semiochemical concentration of which is above the threshold along the supply line;
disinfecting or lowering the temperature or isolating the identified equipment, storage areas, other tobacco material, transportation carrier.

Example Ex39: System to detect the presence of an infestation in tobacco material, the system comprising:
a closed space adapted to house the tobacco material;
a gas sensor adapted to measure the concentration of a semiochemical in the air present in the closed space and adapted to emit a signal representative of the measured concentration;
a cooling unit adapted to lower the temperature inside the closed space;
a control unit connected to the gas sensor and the cooling unit, the control unit being adapted to receive the signal from the gas sensor, to compare the signal with a threshold and to command the cooling unit to cool the closed space if the signal is above the threshold value.

Example Ex40: The system according to Ex39, comprising a second gas sensor adapted to measure the concentration of a volatile substance in the air present in the closed space.

Example Ex41: The system according to Ex40, wherein the second gas sensor is an electronic nose.

Example Ex42: The system according to one or more of Ex39-Ex41, including an air conduit to channel air present in the closed space towards the gas sensor.

Example Ex43: The system according to one or more of Ex37-Ex42, comprising an alarm unit adapted to emit an alarm signal if the signal is above the threshold value.

Example Ex44: The system according to one or more of Ex37-Ex43, comprising a wireless emitter adapted to send data representative to the measured concentration or the comparison to a management unit.

Examples will now be further described with reference to the figures in which:

FIG. 3 is a schematic view of a further embodiment of system according to the invention;

FIG. 4 is a schematic view of a further embodiment of system according to the invention;

Figure 1:
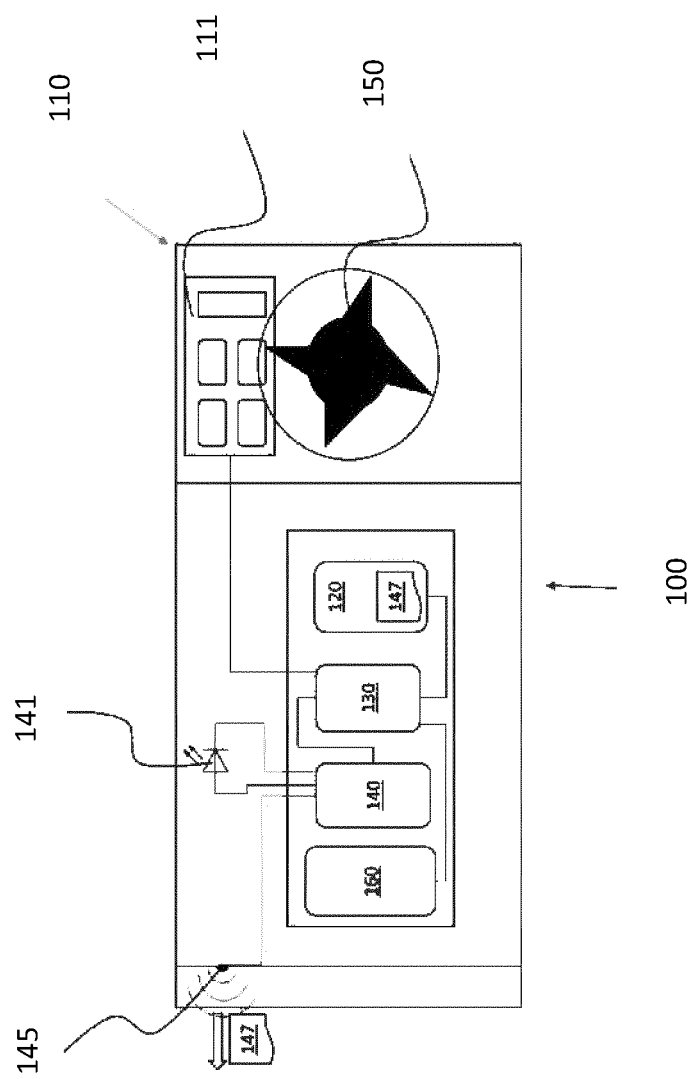
FIG. 1 is a schematic representation of a gas sensor to be used in the system and according to the method of the invention according to the invention.

In FIG. 1, a gas sensor 100 to be used in the method and in the system of the invention is disclosed. Sensor 100 is for example a gas sensor adapted to detect the presence of insect larvae and adult insects in stored products by sensing their volatile pheromones and semiochemicals. An example of such a gas sensor is the one developed and sold by Sensor Development Corporation, under the trade name Contra-Moth® and described in US 2019/0234895. The gas sensor 100 is preferably adapted to detect and measure the concentration of a pheromone produced by the tobacco beetle.

The gas sensor 100 comprises a detection element 110 including a sensor array 111, an air flow system 150, a database 120, a control unit 130, an alert system 140, and optionally an energy source 160.

The detection element 110 is in flow communication with the air flow system 150. The air flow system 150 has the purpose to suck in ambient air towards the sensor array 111. For example, the sensor array 111 may be stored in a chamber (not visible) where ambient air is sucked in. In this way, the detection area in the sensor array 111 is increased. The air flow system 150 for example includes an electrical fan, schematically depicted in FIG. 1. The sensor array 111 comprises a series of different sensors, which are heated to a specific temperature and each set up to detect a specific volatile organic compound or semiochemical, affecting the resistance of the sensor. Furthermore, each sensor of the array is adapted to provide for a signal to be used in a comparison, as described below. The signal is representative of the concentration of the semiochemical to be detected by the sensor. In the present invention, the substance to be sensed by the gas sensor 100 is a pheromone, more preferably a pheromone emitted by the tobacco beetle.

The sensor array 111 is better described in US 2019/0234895.

Preferably, gas sensor 100 may detect a plurality of different semiochemicals. Among all these possible semiochemicals, the desired (target) semiochemical to be detected is selected. For example, the pheromone emitted by the tobacco beetle is selected. The semiochemical if for example selected from database 120.

The database 120 contains a set of possible semiochemical to be detected by the gas sensor 100, each with a corresponding threshold. Preferably, the database 120 contains the profile of the sexual pheromone of the cigarette beetles, namely (4S,6S,7S)-4,6-Dimethyl-7-hydroxynona-3-one as targeted semiochemical.

In some embodiments, the database 120 may also contain other sets of volatiles, for example volatiles caused by the presence of microorganisms, such as mould, bacteria or others which show the quality of the tobacco material. The gas sensor 100 may also be adapted to measure these volatiles and send as an output a signal representative of their concentration. Thus gas sensor 100 may be adapted to detect semiochemicals and other volatiles which are an indication of microbiological activity.

Volatiles that can be an indication of microbiological activity, such as mould and bacteria's, are, for example:

| | |
|---|---|
| 1-octen-3-ol | 2-heptene |
| 1,3-octadiene | Dimethylsulfide |
| methyl-2-ethylhexanoate | 4-heptanone |

The concentration of the selected semiochemical and, if desired, also the concentration of other volatiles, for example one or more of the above volatiles, is thus sent as a signal to the control unit 130.

The gas sensor 100 may detect the concentration of the desired pheromone continuously, or at a given frequency, so that different measures are taken ad predefined time intervals.

The control unit 130, in this case for example a processor, is preferably adapted to run a comparison algorithm to compare the measured data (the concentration of the target semiochemical) of the sensor array 111 with the content of the database. In other words, the control unit 130 compares the concentration of the target semiochemical detected by the sensor array 111 with the threshold for that semiochemical as present in the database 120.

If the comparison is positive, that is, if the concentration is higher than the threshold, an incident data set 147 is preferably created. The incident data set 147 may be created by the control unit 130. The incident data set 147 may comprise one or more of the following information:

"Timestamp" (for example, the time at which the threshold has been exceeded by the measured concentration);

"Incident type" (for example, whether it is the pheromone that has exceeded the threshold, or one of the other volatiles);

"Shipment ID" (for example, the identification ID of the tobacco material or of the bale, or of the shipment itself);

"Check sum" (for example, a checksum is a small-sized datum derived from a block of digital data for the purpose of detecting errors that may have been introduced during its transmission or storage);

"Location information" (for example, where the tobacco material which is "infested" is located).

The incident data set 147 used as an input to a defined warning protocol, passed as an alert to a production management unit 550, or supply chain management unit 620, as detailed below.

The alert system 140 is adapted to send an alert signal to other machines (for example management units) or operators if the concentration as measured by the gas sensor 100 is above the threshold. For example, the alert system 140 may include visual feedback means 141, which are used to inform an operator. The alert system 140 may also include a communication unit 145 to interact with the management unit 550, 620. The communication unit 145 may contain wireless communication means based on technologies like Wi-Fi, Bluetooth, or 3G, 4G, 5G, LTE, for example.

The gas sensor 100 may also be equipped with a location information system like a Global position system, IP geo-location detection or other suitable means.

The gas sensor 100 may also comprise an energy source 160, which is based on a primary or secondary battery, as an example as Li-Ion based battery with a capacity of 9300 mAh/100 WH for embodiments of the gas sensor 100 for mobile applications in a tobacco bale.

The gas sensor 100 is positioned in such a way that detection of the target semiochemical in the air of a closed space is possible. The closed space is a location where tobacco material is housed. The gas sensor 100 may be put in proximity or in contact to tobacco material in the closed space. The gas sensor 100 is used to detect the concentration of the selected semiochemical in the air of the closed space. Examples of closed spaces are given in FIGS. 3-6.

Tobacco material 631 may be located in a tobacco bale 630. The gas sensor 100 may be located in the tobacco bale 630 as well. The tobacco bale 630 is thus the closed space (see FIG. 3). The bales 630 containing the tobacco material 631 may be transported in a carrier, such as loaded on a truck. FIG. 3 shows tobacco bales 630 where the gas sensor is located 100 in close proximity to the tobacco material 631. In this confined area, the measurement of the air within the bales enables concise measurement results. Preferably, the bales 630 are equipped with a visual feedback indicator 141 (schematically depicted as a circle in FIG. 3). If a tobacco bale 630 is infested, that is, if the concentration of the pheromone as measured by gas sensor 100 is above the threshold present in database 120, visual feedback indicator 141 may flash to indicate that the bale as infested.

A plurality of bales 630 with or without a gas sensor 100 may be shipped within a standard shipping carrier 610 as usual in the logistic branch, as depicted in FIG. 4. Such shipping carrier 610 are preferably equipped with a gas sensor 100 and a WAN communication 650. The centrally installed gas sensor in the shipping carrier and the plurality of gas sensors 100 located within tobacco bales 630 may use the WAN communication 650 to send information regarding the concentration of the pheromone in the air insides the bales 630 and in the air inside the carrier 610. The carrier 610 is considered a closed space as well. The information may be sent to a management unit (not shown in FIG. 4). In some embodiments, the shipping carrier 610 is sealed by customs. The gas sensor 100 present within the shipping carrier 610 is adapted to sense the presence of the phero-mone and send a signal via the WAN communication 650 in case the concentration is above the threshold as present in the database 120.

If the measured concentration is above the threshold, the carrier 610 is cooled as a whole or the single bales 630 are cooled.

Figure 2:
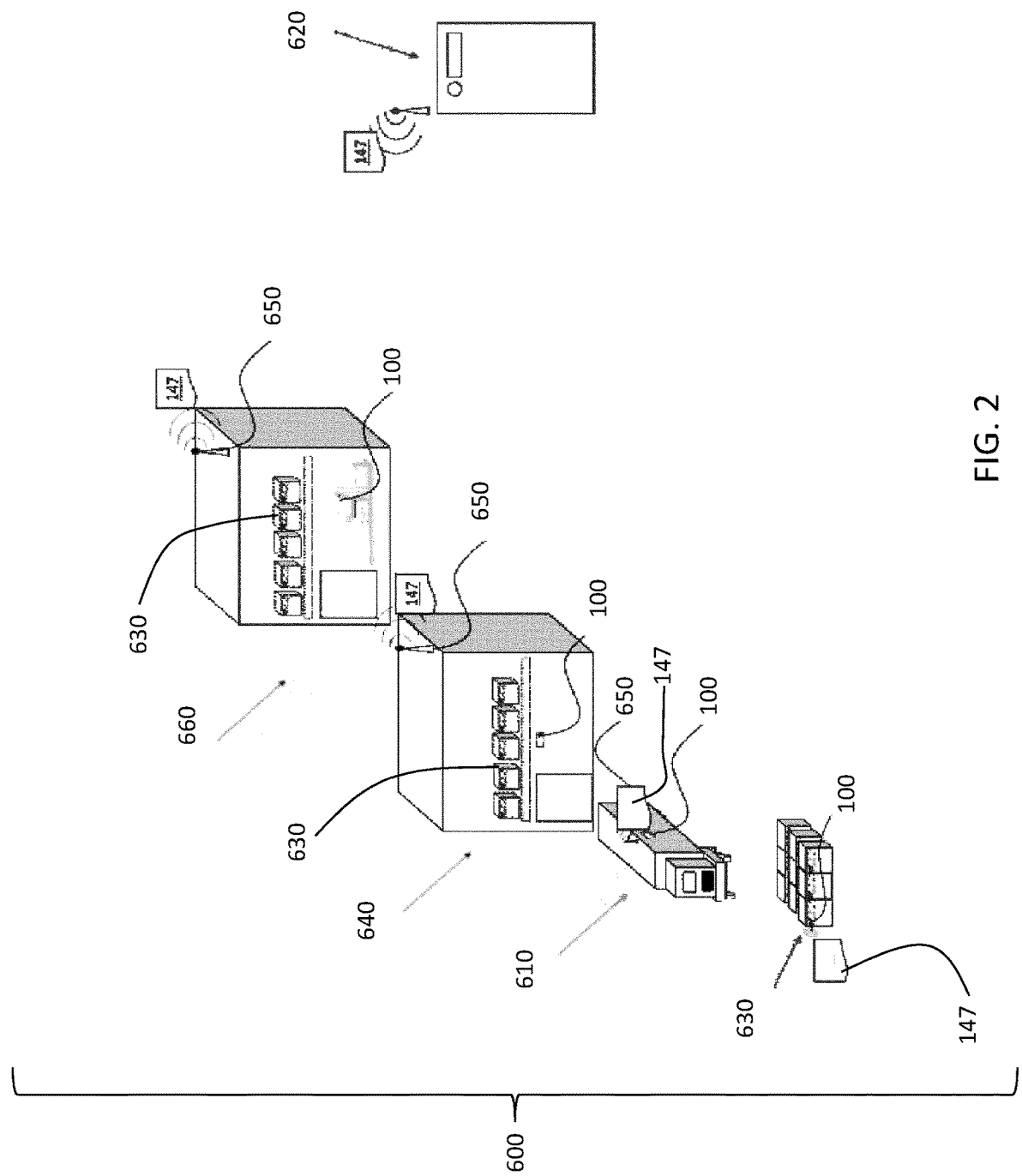
FIG. 2 is a schematic view of a supply chain where the system and method of the invention are implemented according to an embodiment.
Figure 5:
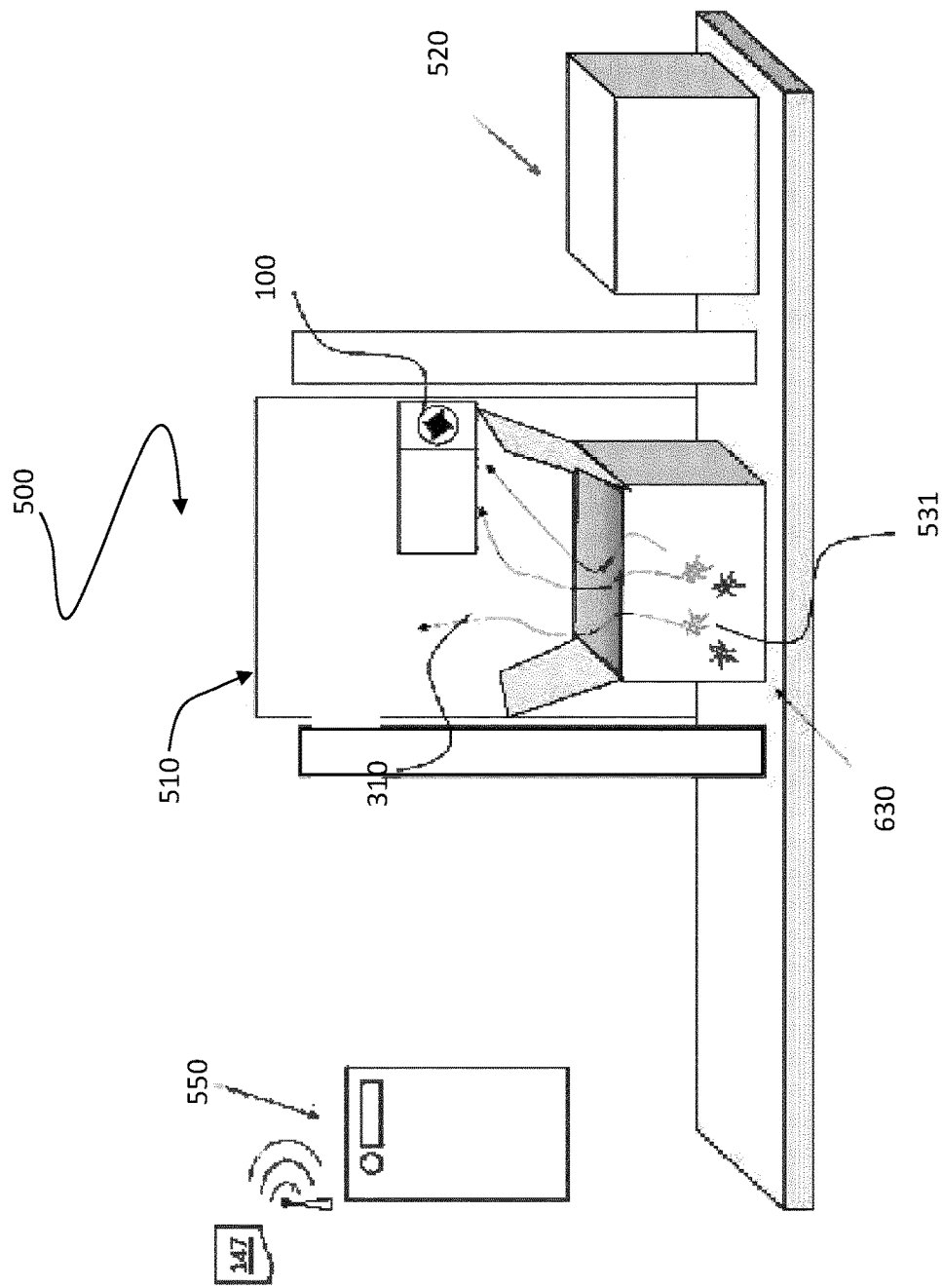
FIG. 5 is a schematic view of a manufacturing area where the system and method of the invention are implemented according to an embodiment.

FIG. 5 shows a bale opening machine 510, as disclosed for example in EP1715765, placed in a manufacturing area 500 in a primary production 660 (shown in FIG. 2). The gas sensor 100 is placed in close proximity to the tobacco bale 630. In this example, the bale 630 is infested by the cigarette beetle 531. Within the infested tobacco bale 630, a phero-mone 310 is present due to nesting activities of the cigarette beetle. As the cutter of the bale opening machine 510 open the infested tobacco bale 630, the gas sensor 100 draws the air with its air flow system 150 towards the detection element 110 and the sensor array 111 is detecting the presence of the pheromone 310. Being the bale infested, the concentration of the pheromone as detected by the gas sensor 100 is higher than the threshold. The gas sensor 100 therefore sends an alarm signal to production management unit 550 with an incident data set 147 and mark the tobacco bale 630 as infested. The tobacco bale 630 is then cooled. The neighbouring tobacco bale 520 is also preferably inspected and cooled, being in close proximity to the infested tobacco bale 630. Other tobacco bales may be inspected as well. Furthermore, the bale opening machine 510, which can be considered a closed space, may be cooled as well.

The tobacco bale 630 or 520 may be cooled by putting it inside an industrial refrigerator (not shown in the drawing), the temperature of which is for example (in the inside) of 6 degrees Celsius. The tobacco bale may stay in the refrig-erator for 6-8 weeks.

Figure 6:
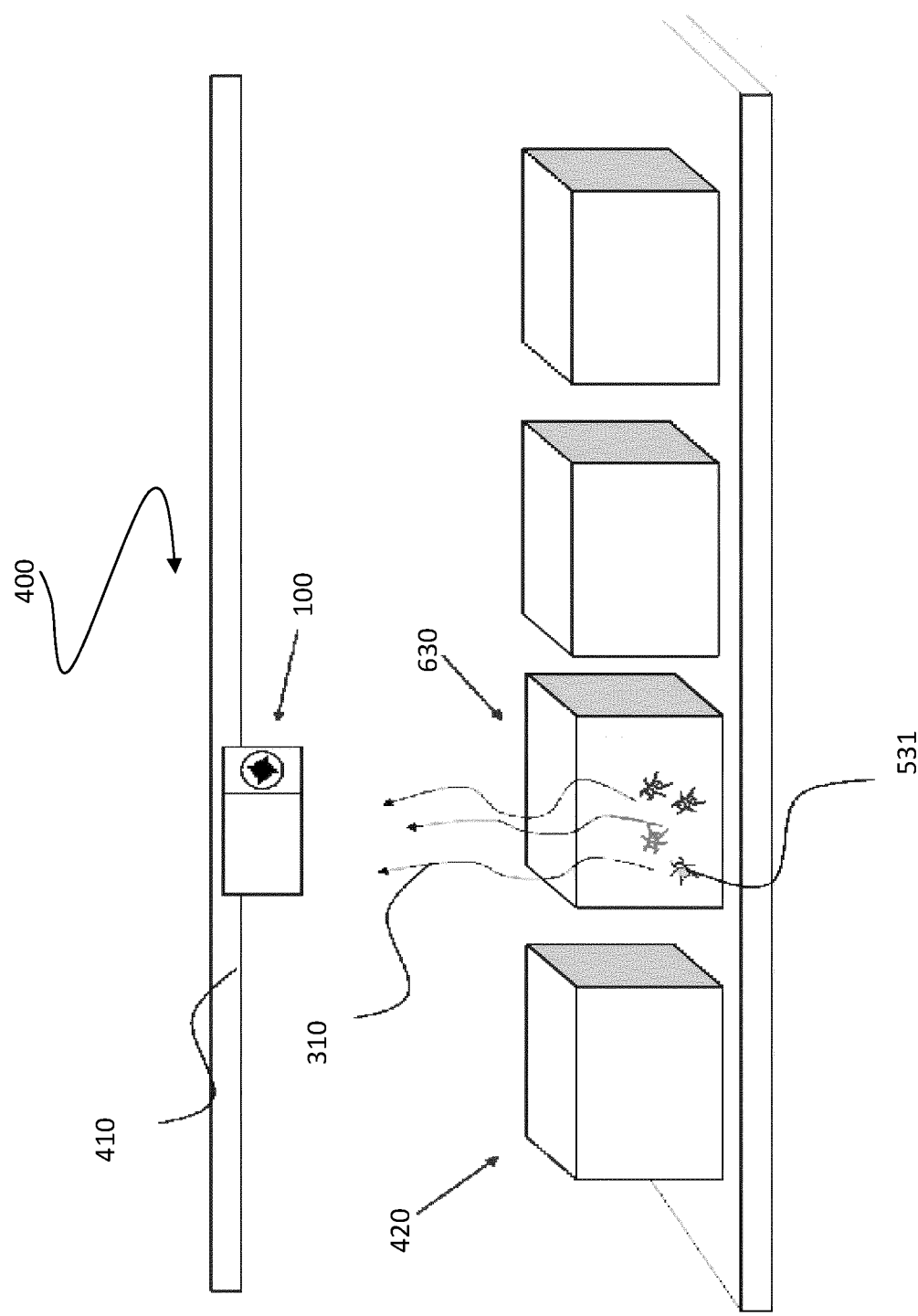
FIG. 6 is a schematic view of a warehouse area where the system and method of the invention are implemented according to an embodiment.

FIG. 6 shows a schematic representation of a warehouse area 400, part of warehouse 640 (shown in FIG. 2), includ-ing a gas sensor 100 attached to a storage shelf 410. An infested tobacco bale 630 is emanating a pheromone 310 by the nesting activities of the cigarette beetle 531. The gas sensor 100 is continuously drawing air by the air flow system 150 over the sensor array 111. A detected pheromone by sensor 100 has a concentration above the threshold, being tobacco bale 630 infested, and thus gas sensor 100 sends a signal to activate the alert system 140. The fact that an infested bale is present may be visually indicated by a flashing LED 141. The warehouse area 400, which is the closed space, the infested bales 630 and the neighbouring bales 420 are cooled.

In an alternative embodiment, the gas sensor 100 may also detect smoke.

FIG. 2 shows an illustration of a simplified supply chain 600 for primary production of tobacco goods. The supply chain starts with the packaging of dried tobacco leaves in tobacco bales 630 from suppliers. The bales are then trans-ported in standard shipping carrier 610. The bales 630 are the stored in warehouses 640 and delivered to primary production 660 sites. Such supply chains are typically man-aged by a supply chain management unit 620, that tracks and coordinates the delivery of the goods from suppliers. All steps of the supply chain are connected, for example via a WAN (Wide area network) communication 650, passing and receiving information, especially incident data sets 147, to the supply chain management unit 620. In order to enable appropriate quality management, the supply chain manage-ment unit 620 stores the data about shipments, supplier, and quality incidents. In case of an infestation by a cigarette beetle, the detection is only possible if a certain amount of time after an infestation has passed, until the laid eggs have turn in larvae or adult bugs. The supply chain management unit 620 is capable of trace the route of the infested tobacco bale 630 back to the supplier and identify potentially infested equipment or tobacco bales, immediately marking them as potentially infested for disinfestation actions and control. The point of an infestation is calculated to enable supplier management or supply chain management to take corrective actions.

Figure 7:
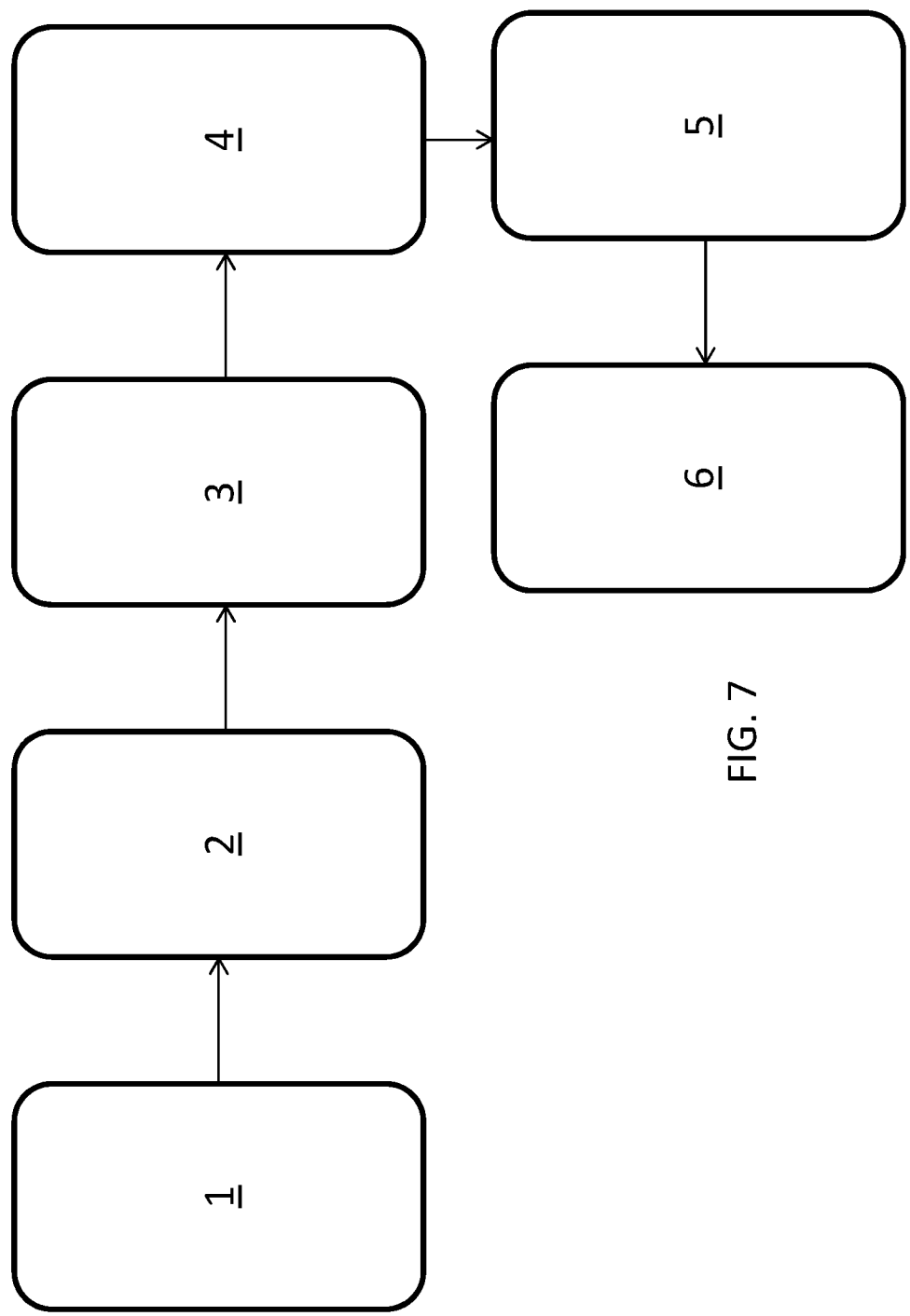
FIG. 7 is a flow diagram of some phases of the method of the invention.

FIG. 7 shows a flow chart of the method of the present invention. The gas sensor 100 is monitoring the air present in the closed space where the tobacco material is present, either a bale, a carrier, a warehouse or others, monitoring the presence and concentration of a specific semiochemical (step 1). The concentration value measured by the gas sensor 100 is compared with the threshold for that specific semiochemical present within the database 120 (step 2). If the measured concentration of the semiochemical exceeds the threshold, then the closed space is cooled (step 3). Further, other actions may be triggered. As an example, notification or alerting of operators or management unit can take place (step 4). The infested tobacco material which is considered to be infested is traced along the supply chain (step 5). All storage units or areas, equipment, other tobacco material, carriers, and others which came into contact or in proximity to the infested tobacco material are preferably inspected. For example, further actions may take place (step 6), such as: marking of areas or equipment or goods as potentially infested; automatic sealing of warehouses to contain the infestation; triggering disinfestation processes. The infested shipping with infested tobacco material may be rerouted: an infested shipping carrier may be sent towards a station where it is cooled.

For the purpose of the present description and of the appended claims, except where otherwise indicated, all numbers expressing amounts, quantities, percentages, and so forth, are to be understood as being modified in all instances by the term "about". Also, all ranges include the maximum and minimum points disclosed and include any intermediate ranges therein, which may or may not be specifically enumerated herein. In this context, therefore, a number A is understood as A±10 percent of A. Within this context, a number A may be considered to include numerical values that are within general standard error for the measurement of the property that the number A represents. The number A, in some instances as used in the appended claims, may deviate by the percentages enumerated above provided that the amount by which A deviates does not materially affect the basic and novel characteristic(s) of the claimed invention. Also, all ranges include the maximum and minimum points disclosed and include any intermediate ranges therein, which may or may not be specifically enumerated herein.

The invention claimed is:

1. A method to monitor tobacco material to detect insect infestation, the method comprising:
   providing tobacco material in a closed space;
   measuring the concentration of a semiochemical in the air present in the closed space;
   comparing the measured concentration of the semiochemical with a threshold;
   lowering the temperature of the closed space if the concentration of the semiochemical is higher than the threshold
   associating an identifier to the tobacco material present in the closed space;
   if the measured concentration of the semiochemical is higher than the threshold, creating a data set comprising the identifier and a value representative of the measured concentration or of the comparison between the measured concentration and the threshold;
   sending the data set to a management unit;
   tracking the tobacco material present in the closed space along a supply line.

2. The method of claim 1, wherein the semiochemical is one or more of:
   (2S,3R,1'S)-2,3-Dihydro-3,5-dimethyl-2-ethyl-6 (1-methyl-2-oxobutyl)-4H-pyran-4-one;
   (2S,3R,1'R)-2,3-Dihydro-3,5-dimethyl-2-ethyl-6 (1-methyl-2-oxobutyl)-4H-pyran-4-one;
   (2S,3R)-2,3-Dihydro-3,5-dimethyl-2-ethyl-6-(1-methyl-2-oxobutyl)-4H-pyran-4-one;
   (4S,6S,7S)-4,6-Dimethyl-7-hydroxynona-3-one;
   (2S,3S)-2,6-Diethyl-3,5-dimethyl-3,4-dihydro-2H-pyran.

3. The method according to claim 1, including:
   sending an alarm signal if the measured concentration of the semiochemical is higher than the threshold.

4. The method according to claim 3, wherein sending an alarm signal includes one of:
   emitting an audible signal;
   emitting a visual signal;
   sending a digital text message to an operator or a management unit;
   sending data relative to the measured concentration or the comparison between the measured concentration and the threshold to an operator or a management unit.

5. The method according to claim 1, wherein creating a data set includes one or more of:
   creating a data set comprising information of the time at which the comparison has been made;
   creating a data set comprising information of the geographical location of the closed space.

6. The method according to claim 1, wherein providing tobacco material in a closed space includes one or more:
   providing the tobacco material in a bale;
   providing the tobacco material in a warehouse;
   providing the tobacco material in a transporting carrier;
   providing the tobacco material in a manufacturing area.

7. The method according to claim 1, comprising:
   providing the closed space with an emitter;
   the emitter emitting a signal if the measured concentration of the semiochemical is higher than the threshold;
   providing a receiver outside the closed space adapted to receive signal sent by the emitter;
   identifying the closed space as infested when the signal is received.

8. The method according to claim 1, comprising:
   providing the closed space with a visual indicator having a first status and a second status;
   displaying the first status in the visual indicator;
   switching the displayed status from the first status to the second status if the concentration of the semiochemical is higher than the threshold.

9. The method according to claim 1, comprising:
   measuring the concentration of a volatile substance produced by microbiological activity in the air present in the closed space.

10. The method according to claim 9, wherein the air borne volatile substance is one or more of:
    1-octen-3-ol;
    1,3-octadiene;
    methyl-2-ethylhexanoate;
    2-methylfuran;
    3-methylfuran;
    3-methyl-1-butanol;
    2-methyl-1-butanol;
    2-heptene;
    Dimethylsulfide;
    4-heptanone;
    (5H)-furanone;
    3-heptanol;
    Methoxybenzene.

11. The method according to claim 1, comprising:
    if the measured concentration of the semiochemical in the air present in the closed environment is higher than the threshold, then:

identifying equipment, storage areas, other tobacco material, transportation carrier along the supply line which has been in contact or in proximity to the tobacco material the semiochemical concentration of which is above the threshold;

disinfecting or lowering the temperature or isolating the identified equipment, storage areas, other tobacco material, or transportation carrier.

12. The method according to claim 1, wherein the lowering of the temperature of the closed space is started automatically by the management unit upon receipt of the result of the comparison between the concentration of the semiochemical and the threshold, wherein the measured concentration is higher than the threshold.

13. A system to detect the presence of an infestation in tobacco material, the system comprising:

a closed space adapted to house the tobacco material;

a gas sensor adapted to measure the concentration of a semiochemical in the air present in the closed space and adapted to emit a signal representative of the measured concentration;

a cooling unit adapted to lower the temperature of the closed space;

a control unit connected to the gas sensor and the cooling unit, the control unit being adapted to receive the signal from the gas sensor, to compare it with a threshold and to command the cooling unit to cool the closed space if the signal is above the threshold a data set comprising an identifier associated to the tobacco material present in the closed space and a value representative of the measured concentration or of the comparison between the measured concentration and the threshold;

a management unit arranged to receive data from the data set so as to track the infested tobacco material along a supply chain.

14. The system according to claim 13, including an air conduit to channel air present in the closed environment towards the gas sensor.

15. The system according to claim 13, comprising an alarm unit adapted to emit an alarm signal if the signal is above the threshold.

16. The system according to claim 13, wherein the gas sensor is located inside the closed space.

17. The system according to claim 13, wherein the control unit is adapted to compare the signal from the gas sensor with a first threshold and a second threshold, the second threshold being higher than the first threshold, and comprising an alarm unit adapted to emit an alarm signal if the signal of a first measurement and a second measurement is above the first threshold and below the second threshold or if the signal of a single measurement is above the second threshold.

* * * * *